United States Patent
Liu et al.

(10) Patent No.: US 6,307,756 B1
(45) Date of Patent: Oct. 23, 2001

(54) CONNECTOR HOLDER WITH CONDUCTIVE SHIELD

(75) Inventors: Alvin Liu; Yu Tai Liu, both of Taipei (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/605,561

(22) Filed: Jun. 27, 2000

(51) Int. Cl.⁷ ...................................................... H05K 9/00
(52) U.S. Cl. .......................... 361/816; 361/683; 361/800; 361/801; 174/35 R; 439/607
(58) Field of Search .................... 361/683, 752, 361/801, 802, 800, 816, 818; 174/35 R; 439/607–610, 939

(56) References Cited

U.S. PATENT DOCUMENTS

| | | | |
|---|---|---|---|
| 5,207,597 | * | 5/1993 | Kline et al. .......................... 439/607 |
| 5,347,430 | * | 9/1994 | Curlee et al. ........................ 361/818 |
| 5,378,172 | * | 1/1995 | Roberts ................................ 439/607 |
| 5,497,292 | * | 3/1996 | Gandre ................................ 361/818 |
| 5,647,765 | * | 7/1997 | Haas et al. ........................... 439/609 |
| 5,684,271 | * | 11/1997 | Scholder et al. .................... 174/35 R |
| 5,822,182 | * | 10/1998 | Scholder et al. ..................... 361/683 |
| 5,980,320 | * | 11/1999 | Slack et al. .......................... 439/607 |
| 6,113,426 | * | 9/2000 | Lin ....................................... 439/607 |
| 6,166,325 | * | 12/2000 | Wu ................................. 174/35 GC |
| 6,220,895 | * | 4/2001 | Lin ....................................... 439/607 |

* cited by examiner

*Primary Examiner*—Jayprakash N. Gandhi
(74) *Attorney, Agent, or Firm*—Wei Te Chung

(57) ABSTRACT

A connector holder includes a conductive shield and an insulating housing receiving the shield therein. The shield forms projections on opposite walls thereof for engaging a surface of a front panel of a computer enclosure adjacent edges of an opening defined in the front panel. A resilient latch extends from a wall of the housing through the opening of the front panel and forms a barb for engaging with a tab of the front panel for securely fixing the connector holder to the front panel. Fixing pins are formed on an edge of the housing of the connector holder for being received in corresponding holes defined in the front panel to properly position the connector holder with respect to the front panel. The engagement between the projections of the shield and the front panel forms an electrical path for grounding the shield to the front panel.

8 Claims, 6 Drawing Sheets

CONNECTOR HOLDER WITH CONDUCTIVE SHIELD

BACKGROUND

1. Field of the Invention

The present invention relates to a computer enclosure, and particularly to a computer enclosure having a connector holder attached thereto for readily and effectively fixing connectors to the enclosure.

2. The Related Art

Connectors for transferring signals and power, such as USB (Universal Serial Bus) connectors and IEEE 1394 connectors, are soldered to a motherboard. Openings are defined in a rear panel of a computer enclosure to expose the connectors for connection with other peripheral devices. Examples are disclosed in U.S. Pat. Nos. 5,347,430, 5,497,292 and 5,822,182. However, when assembling a mouse, a keyboard or a joystick to a computer with this kind of connector layout, users have to plug the connectors into the rear panel from the rear side of the computer, which causes great inconvenience to the users especially when the computer is placed in front of a wall or a fixture.

To solve the problem, USB connectors and IEEE 1394 connectors are mounted to a motherboard for being exposed through a front panel of a computer allowing peripheral devices to be directly attached to the computer from the front side. In a known arrangement, a circuit board with connectors mounted thereon is retained in a metal chamber secured to the front panel by engagement between a barb formed on the chamber and a fixing hole defined in the front panel. An aperture covered by a movable transparent plastic lid is defined in a decorative bezel attached to the front panel. However, a portion of the enclosure must be removed first before the chamber can be mounted to the enclosure. This is a time-consuming and complicated process. Moreover, the chamber is attached to the front panel by means of the metal barb, which makes the attachment unstable. Further, the metal chamber is covered by a transparent plastic lid, which has an adverse effect on the ornamental design of the computer bezel.

SUMMARY OF THE INVENTION

Accordingly, an object of the present invention is to provide a connector holder for being mounted to a computer enclosure to allow connectors to be directly fixed to the front panel of the computer enclosure.

Another object of the present invention is to provide a connector holder having a simple structure which is easy to assemble.

A further object of the present invention is to provide a connector holder to be mounted to a computer enclosure which is visually and aesthetically compatible with the ornamental design of a computer bezel.

A further object of the present invention is to provide a connector holder for mounting connectors to a computer enclosure, an electrical path being formed between the connector holder and the front panel to ground the connector holder to the front panel.

To achieve the above-mentioned objects, a connector holder in accordance with the present invention comprises a conductive shield defining a chamber for receiving and retaining connectors therein and an insulating housing defining an interior space for receiving the shield therein. The connector holder is received in an opening defined in a front panel of a computer enclosure for fixing the connectors thereto. The shield comprises at least a finger engaging a notch defined in the housing for retaining the shield in the housing and at least a first opening for exposing the connectors therethrough. The shield forms a projection for engaging a first surface of the front panel which not only supports the connector holder on the front panel but also forms an electrical path grounding the shield to the front panel. The insulating housing forms at least a second opening corresponding to the first opening of the shield. The housing forms a resilient latch extending through the opening of the front panel to engage a corresponding second surface which is opposite the first surface of the front panel thereby securing the connector holder onto the front panel.

Other objects, advantages and novel features of the present invention will be drawn from the following detailed description of an embodiment thereof with reference to the attached drawings, in which:

DESCRIPTION OF THE PREFERRED EMBODIMENT

Figure 1:
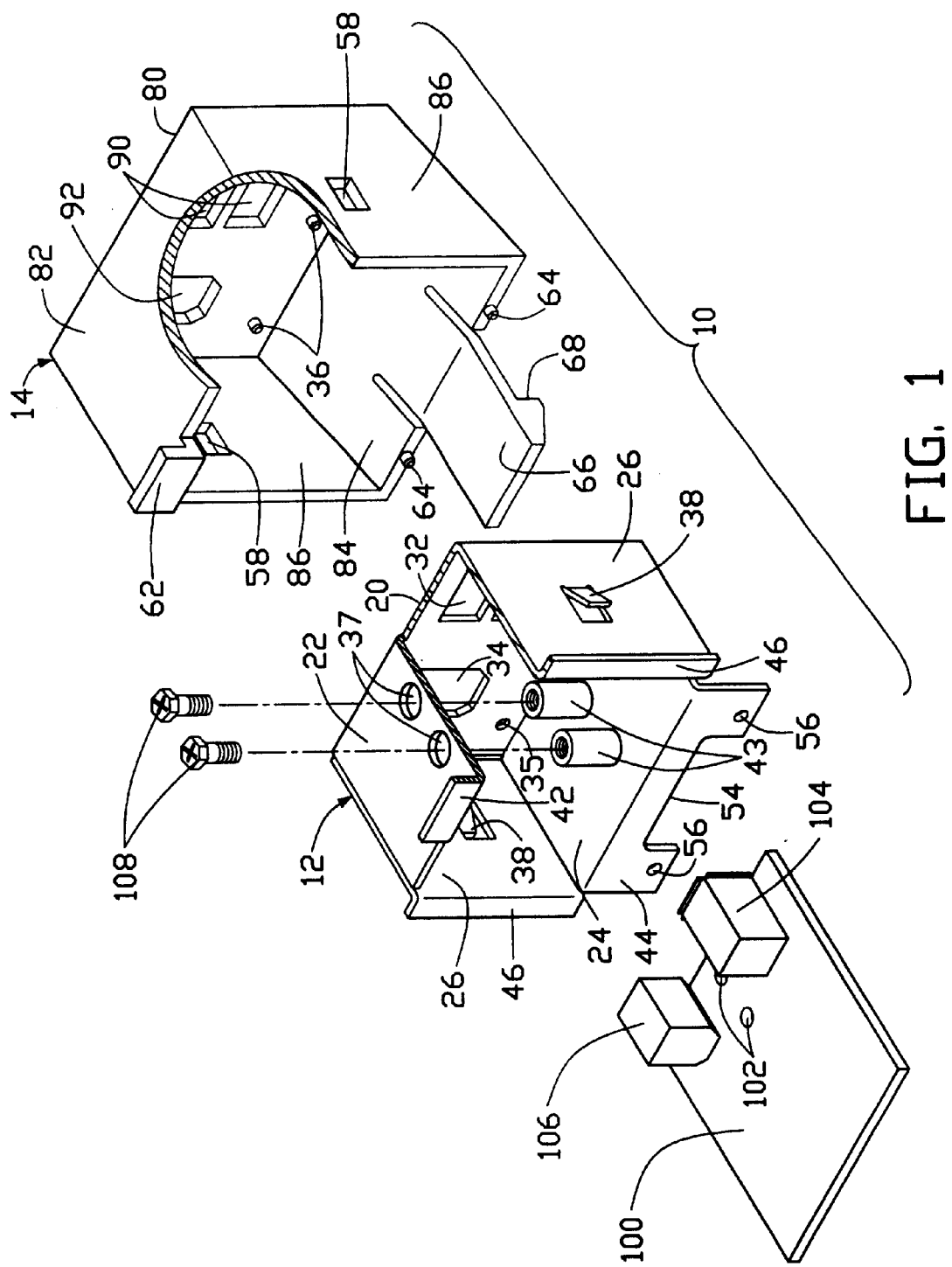
FIG. 1 is an exploded view of a connector holder constructed in accordance with the present invention.

Referring to FIG. 1, a connector holder 10 of the present invention comprises a shield 12 and an insulating housing 14. The shield 12 has a first front wall 20, a first top wall 22, a first bottom wall 24 and a pair of first side walls 26 defining a first chamber (not labeled) therebetween. Two first openings 32, a second opening 34 and two fixing holes 35 are defined in the first front wall 20. Each first side wall 26 forms an elastic finger 38. The first top wall 22 defines two through apertures 37. A first bent plate 42 extends outwardly from an edge of the first top wall 22. Two fixing poles 43 with inner-threaded holes (not labeled) are riveted to or otherwise fixed to an inside face of the first bottom wall 24 aligning with the two through apertures 37. A second bent plate 44 extends from an edge of the first bottom wall 24 opposite the first bent plate 42. A pair of fixing holes 56 is defined in the second bent plate 44. A cutout 54 is defined in the second bent plate 44 between the fixing holes 56. A third bent plate 46 extends from an edge of each first side wall 26. In the embodiment illustrated, the bent plates 42, 44, 46 are formed by bending free edges of the walls 22, 24, 26. Alternatively, the bent plates may be replaced by projections formed on the free edges of the walls 22, 24, 26.

Figure 2:
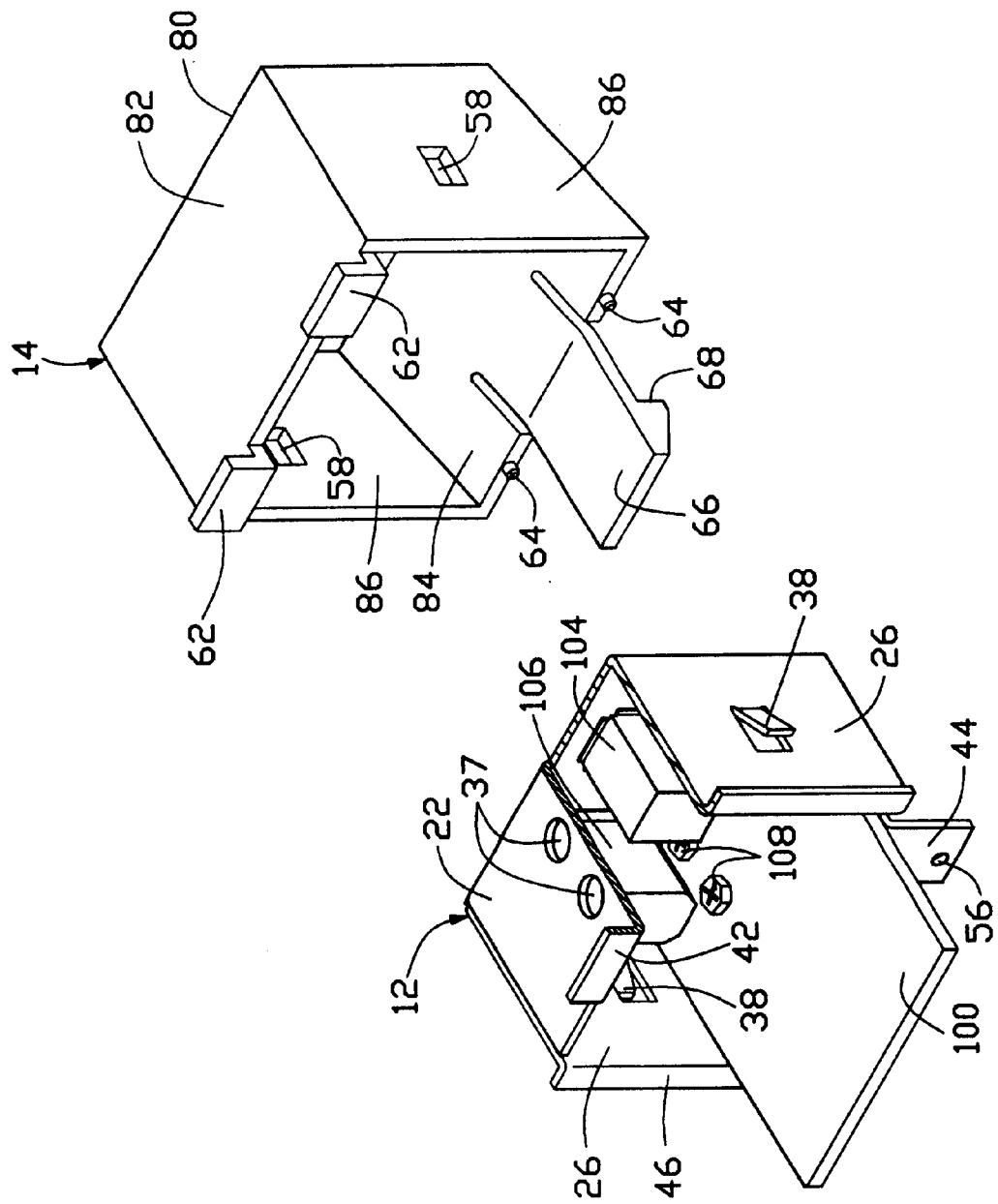
FIG. 2 is similar to FIG. 1 but showing connectors mounted to a shield of the connector holder of the present invention.

Also referring to FIG. 2, a circuit board 100 with connectors 104, 106 mounted thereon is received in the first chamber of the shield 12 with the connectors 104, 106 being respectively aligned with and exposed through the first openings 32 and the second opening 34. The circuit board 100 defines two through holes 102 corresponding to the fixing poles 43. Screws 108 extend through the holes 102 and engage with the inner-threaded holes of the fixing poles 43 for securing the circuit board 100 to the fixing poles 43. Thus, the circuit board 100 is firmly mounted in the shield 12.

The insulating housing 14 comprises a second front wall 80, a second top wall 82, a second bottom wall 84 and a pair of second side walls 86 defining a second chamber (not labeled). The second front wall 80 defines first openings 90 and a second opening 92 respectively corresponding to the openings 32, 34 of the first front wall 20 of the shield 12. Two fixing pins 36 are formed on the second front wall 80 corresponding to the fixing holes 35 of the shield 12. Two notches 58 are respectively defined in the second side walls 86 corresponding to the fingers 38 of the shield 12. Two locking plates 62 extend outwardly from a free edge of the second top wall 82. Two fixing pins 64 extend from a free edge of the second bottom wall 84 corresponding to the fixing holes 56 of the shield 12. A resilient latch 66 is formed with the second bottom wall 84 between the fixing pins 64. The latch 66 forms a barb 68 at a distal end thereof.

Figure 3:
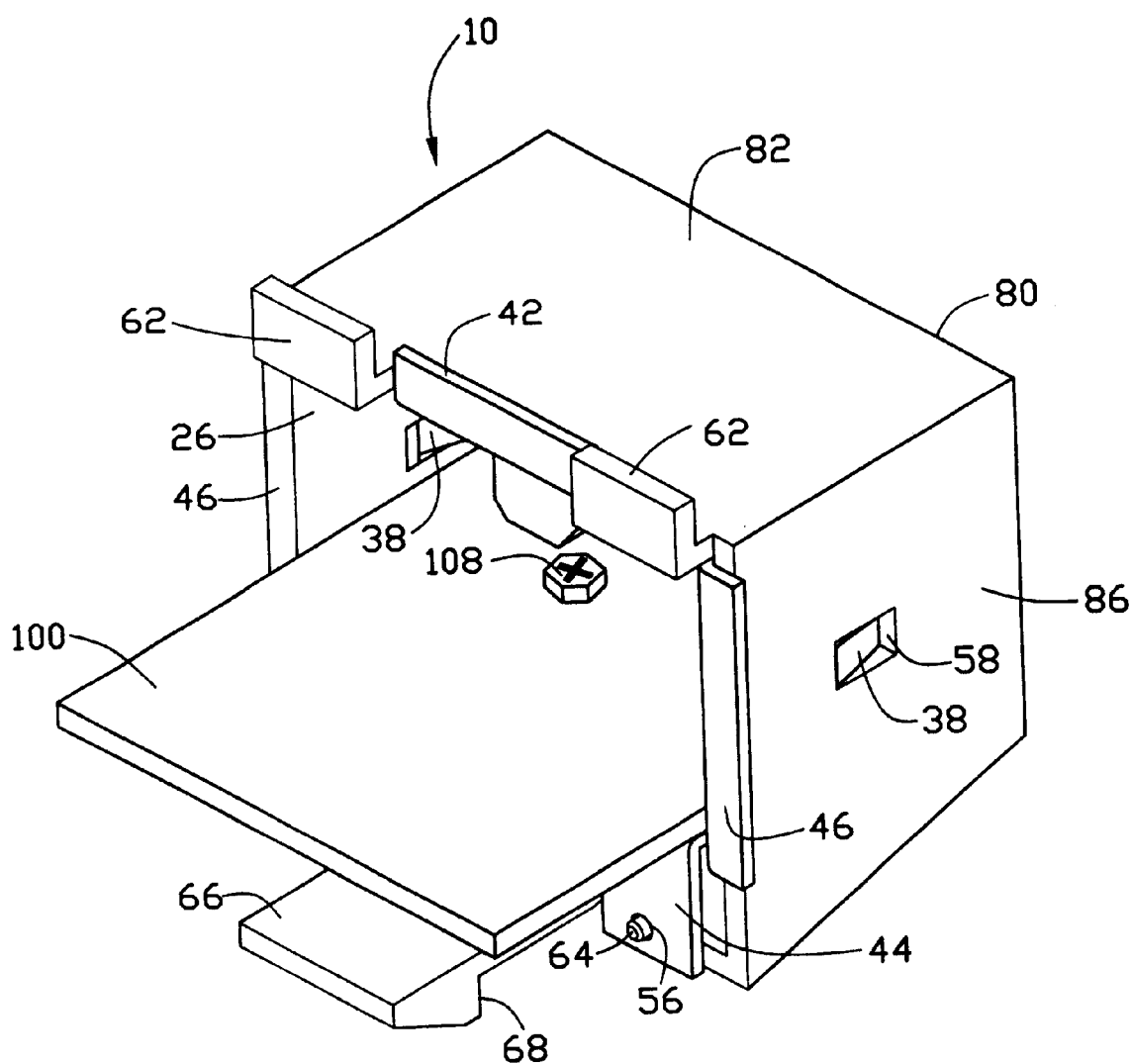
FIG. 3 is an assembled view of FIG. 1.

Referring to FIGS. 1–3, in assembly, the shield 12 is received in the second chamber of the insulating housing 14. The fingers 38 of the shield 12 engage with the notches 58 of the insulating housing 14 for retaining the shield 12 in the housing 14. The fixing pins 36, 64 of the insulating housing 14 are respectively received in the fixing holes 35, 56 of the shield 12 for properly positioning the shield 12 in the housing 14. The first bent plate 42 of the shield 12 rests against the free edge of the second top wall 82 between the two locking plates 62 of the insulating housing 14. The bent plates 46 respectively rest against the free edges of the second side walls 86 of the insulating housing 14. The latch 66 of the insulating housing 14 extends through the cutout 54 of the shield 12. Thus, the shield 12 is received in the insulating housing 14 with the openings 32, 34 of the shield 12 aligned with the openings 90, 92 of the insulating housing 14 for providing access to complementary connectors.

Figure 4:
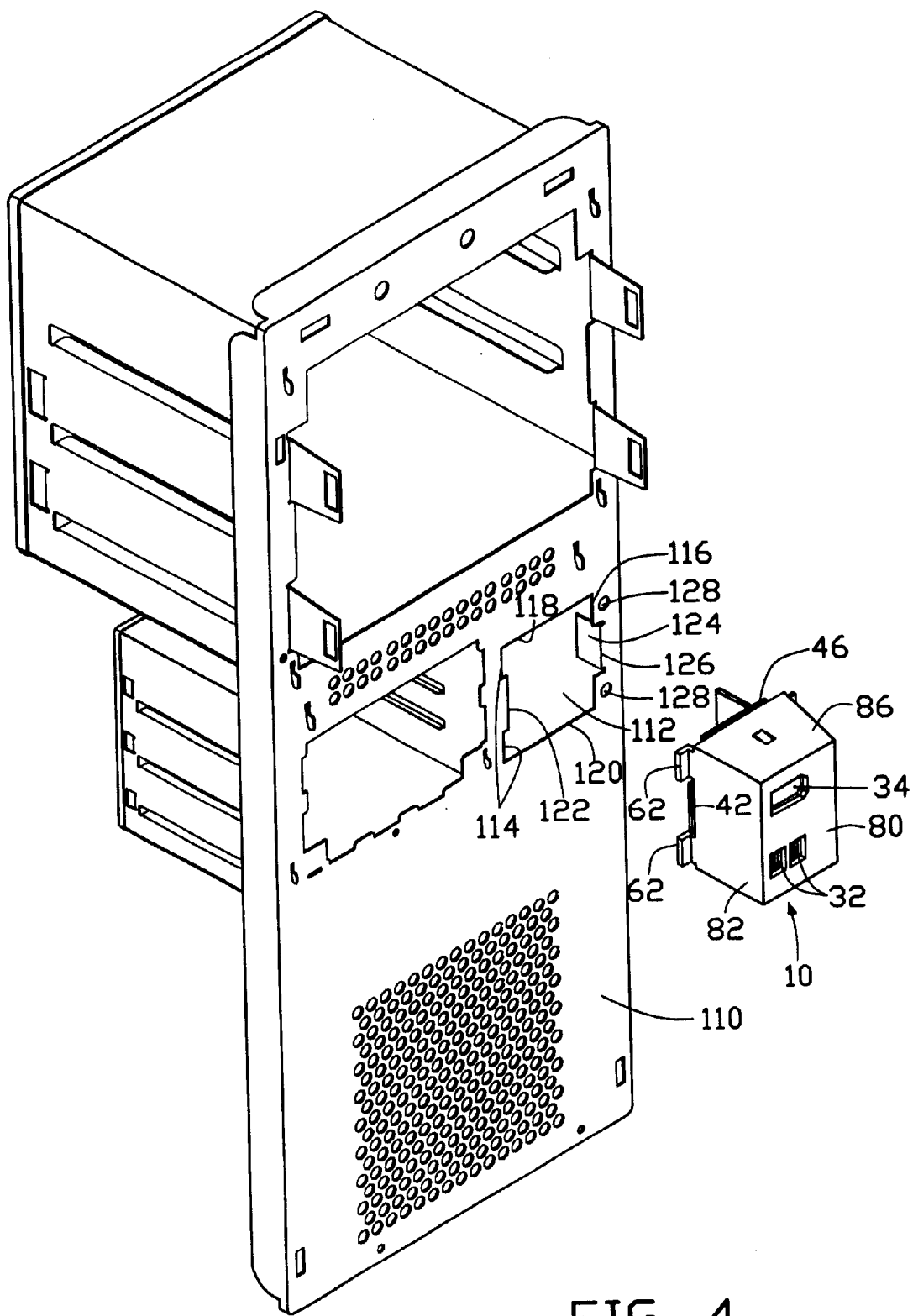
FIG. 4 is a perspective view showing the connector holder of FIG. 3 about to be mounted to a front panel of a computer enclosure.

Referring to FIGS. 3 and 4, a front panel 110 of a computer enclosure defines an opening 112 for receiving and retaining the connector holder 10. The opening 112 comprises a first edge 114, a second edge 116, a third edge 118 and a fourth edge 120. A first tab 122 extends from the first edge 114. A cutout 126 is defined in the second edge 116 with a second tab 124 perpendicularly extending therefrom. Two fixing holes 128 are defined in the front panel 110 proximate to the second edge 116 on opposite sides of the cutout 126 for receiving the fixing pins 64 of the insulating housing 14 therein, thereby properly positioning the connector holder 10 with respect to the front panel 110.

Figure 5:
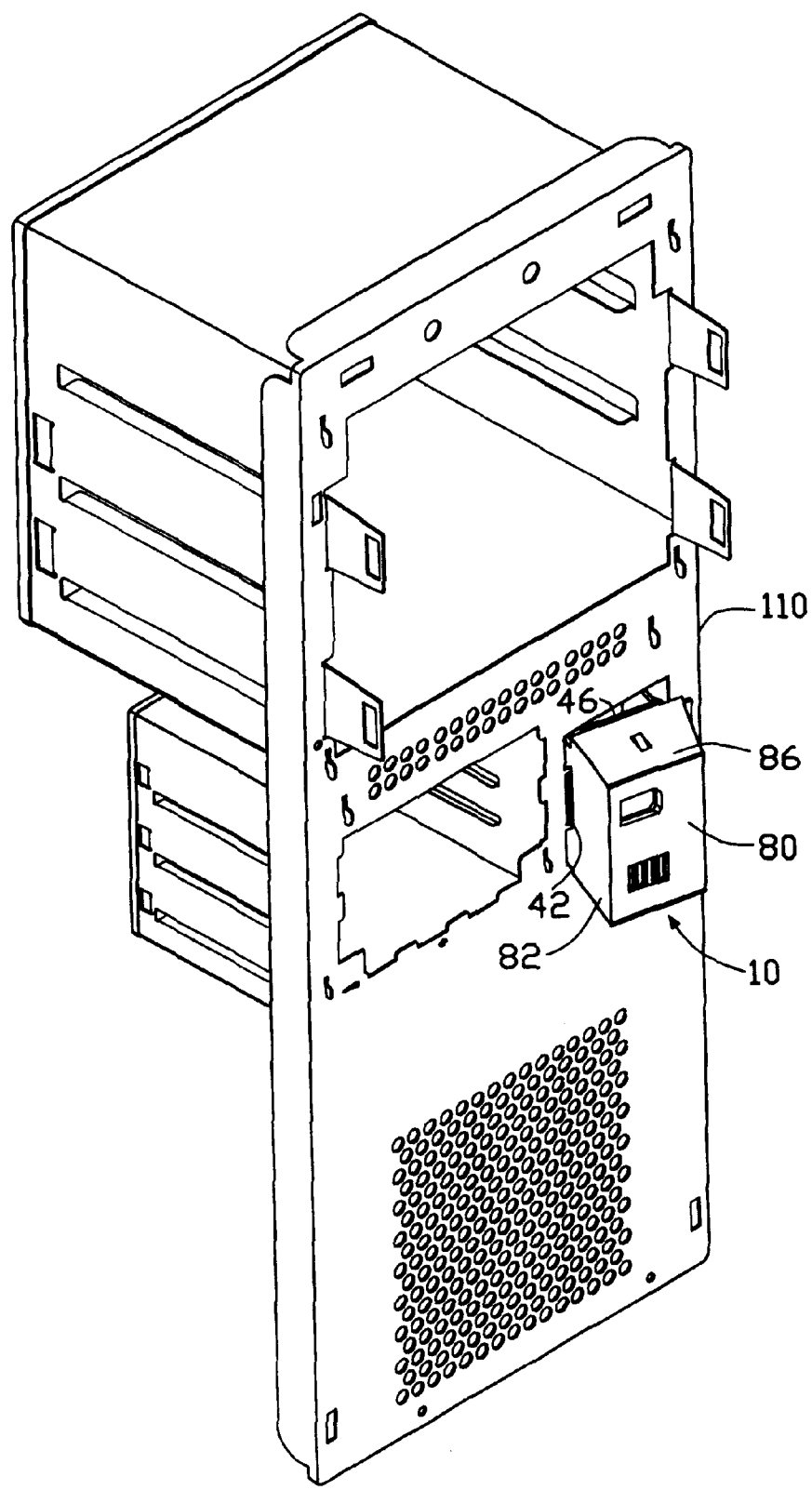
FIG. 5 is a partially assembled view of FIG. 4 showing the connector holder initially received in an opening defined in the front panel.
Figure 6:
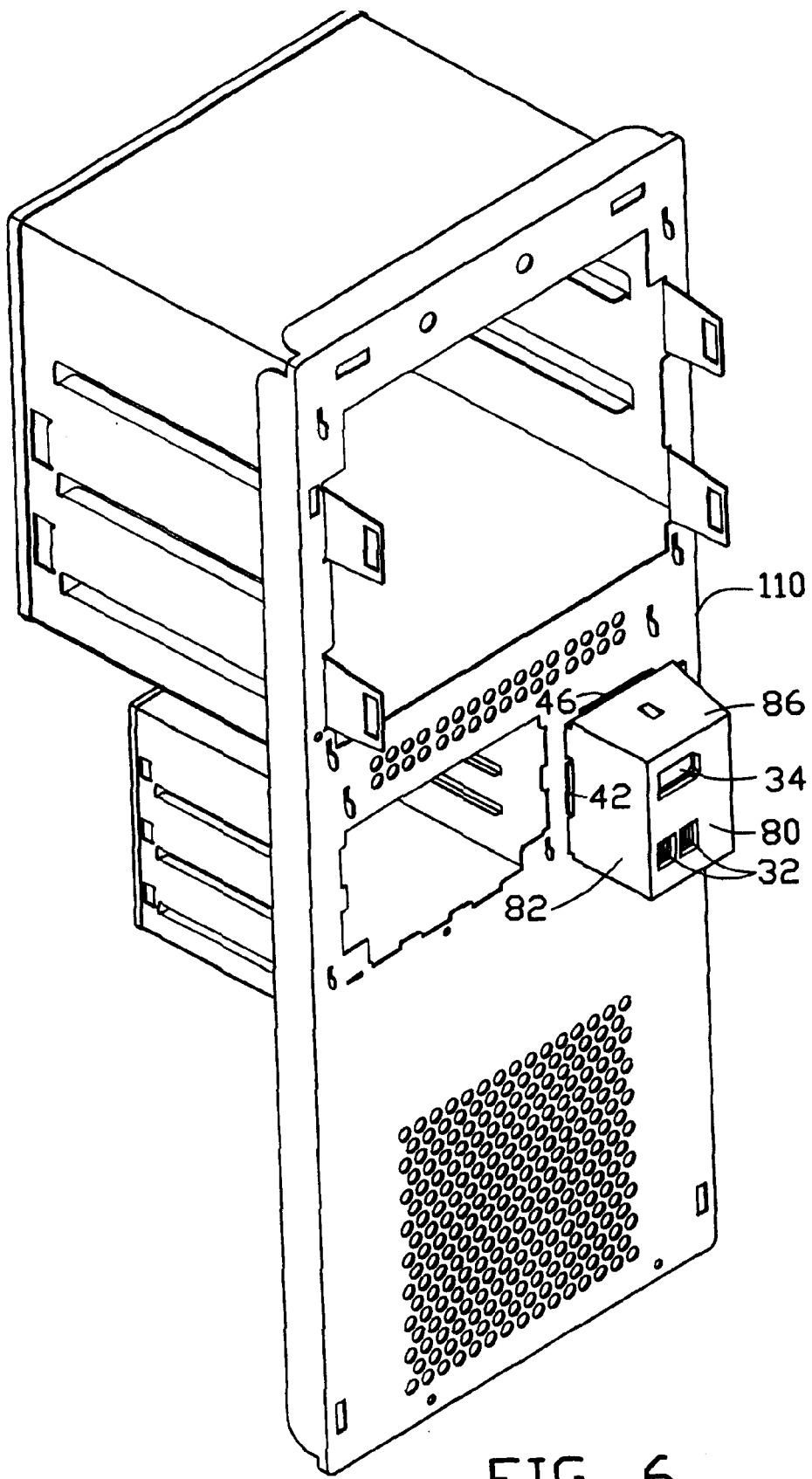
FIG. 6 is an assembled view of FIG. 4 showing the connector holder being completely received in the opening of the front panel.

Also referring to FIGS. 5 and 6, to attach the connector holder 10 to the front panel 110, the locking plates 62 are positioned behind an inner surface of the first edge 114 of the opening 112 while the first bent plate 42 is positioned in front of the first edge 114 and abuts against the tab 122. The connector holder 10 is then moved so that the latch 66 is driven into the cutout 126 and the bent plates 42, 44, 46 are supported on an outside surface of the front panel 110. The barb 68 of the latch 66 is brought to engage the second tab 124 thereby retaining the connector holder 10 on the front panel 110. The two fixing pins 64 are received in the fixing holes 128 of the front panel 110 for positioning purposes. The bent plates 46 respectively rest against the edges 118, 120 of the opening 112. Therefore, the connector holder 10 is firmly secured to the front panel 110. Moreover, the four bent plates 42, 44, 46 physically contact the front panel 110 thereby forming electrical engagement therebetween for grounding the shielding 12.

To remove the connector holder 10 from the front panel 110, the latch 66 is pressed inwardly to release the barb 68 thereof from the second tab 124. Then the connector holder 10 is rotated outwardly until the latch 66 fully disengages from the cutout 126. The bent plate 42 is detached from the tab 122 with the locking plates 62 disengaging from the first edge 114 of the opening 112 thereby removing the connector holder 10 from the front panel 110.

A computer bezel (not shown) is usually mounted to the front panel 110 for aesthetic purposes. The bezel defines an opening for exposing the connector holder 10. Preferably, the insulating housing 14 of the connector holder 10 is made of the same material as the computer bezel or they may have the same decoration. This makes the connector holder visually integrated with the bezel and imposes no adverse effect on the ornamental design of the computer bezel.

It is understood that the invention may be embodied in other forms without departing from the spirit thereof. Thus, the present example and embodiment are to be considered in all respects as illustrative and not restrictive, and the invention is not to be limited to the details given herein.

What is claimed is:

1. A computer enclosure comprising:
    a front panel defining an opening having opposite edges, a tab extending from a first one of the edges; and
    a connector holder comprising:
    a conductive shield defining a chamber adapted to receive and retain at least one connector therein, the shield comprising at least a finger, and at least a first opening for exposing the connector; and
    an insulating housing defining an interior space for receiving the shield therein, the housing forming at least a notch engaging the finger of the shield for retaining the shield in the interior space and at least a second opening corresponding to the first opening of the shield;
    wherein the shield forms projections on opposite sides thereof corresponding to the edges of the opening of the front panel for engaging the front panel, the housing forming a resilient latch extending through the opening of the front panel and having a barb engaging a free end of the tab to fix the connector holder to the front panel.

2. The computer enclosure as described in claim 1, wherein at least a fixing pin is formed on the insulating housing for being received in a fixing hole formed in the front panel defined for positioning the connector holder with respect to the front panel.

3. The computer enclosure as described in claim 1 further comprising a bezel mounted to the front panel, the bezel defining an opening through which the connector holder extends, the insulating housing of the connector holder being made with the same material as the bezel.

4. The computer enclosure as described in claim 1, wherein the engagement between the projections of the shield and the front panel forms an electrical path which grounds the shield to the front panel.

5. An enclosure assembly comprising:
a front panel defining an aperture therein;
a conductive shield defining a chamber and a first opening;
a connector retained in the chamber and exposed to an exterior through said first opening;
an insulative housing defining an interior space receiving said shield therein, said housing defining a second opening in alignment with said first opening;
means for retaining the shield to the housing; and
means for fastening the housing to the panel to cover said aperture.

6. The assembly as described in claim 5, wherein a printed circuit board is retainably received in the space and said connector is mounted on said printed circuit board.

7. The assembly as described in claim 6, wherein said housing further includes a rearwardly extending latch which is parallel to said printed circuit board.

8. The assembly as described in claim 7, wherein said means for fastening the housing to the panel includes said latch and at least a bent plate opposite and perpendicular to said latch.

* * * * *